United States Patent [19]
Callaghan, Jr.

[11] 4,129,949
[45] Dec. 19, 1978

[54] HEIGHT GAGE

[75] Inventor: Robert P. Callaghan, Jr., Westerly, R.I.

[73] Assignee: Brown & Sharpe Manufacturing Company, North Kingstown, R.I.

[21] Appl. No.: 861,957

[22] Filed: Dec. 19, 1977

Related U.S. Application Data

[63] Continuation-in-part of Ser. No. 673,727, Apr. 5, 1976.
[51] Int. Cl.² .............................................. G01B 5/14
[52] U.S. Cl. .............................. 33/169 R; 33/DIG. 2; 188/67
[58] Field of Search ............. 33/169 R, 170 R, 170 A, 33/171, 172 R, 172 A, DIG. 2; 188/170, 67; 308/DIG. 1, 9

[56] References Cited
U.S. PATENT DOCUMENTS

| 3,231,319 | 1/1966 | Porath | 33/DIG. 2 |
| 3,695,144 | 10/1972 | Goiffon et al. | 188/67 |
| 3,864,834 | 2/1975 | Horton | 33/169 R |

Primary Examiner—Harry N. Haroian
Attorney, Agent, or Firm—Barlow & Barlow

[57] ABSTRACT

This invention relates to a height gage of a type to be attached to a digital readout and in which a source of air under pressure is utilized for providing anti-friction means for moving a slide which carries a tool for measuring distance.

5 Claims, 9 Drawing Figures

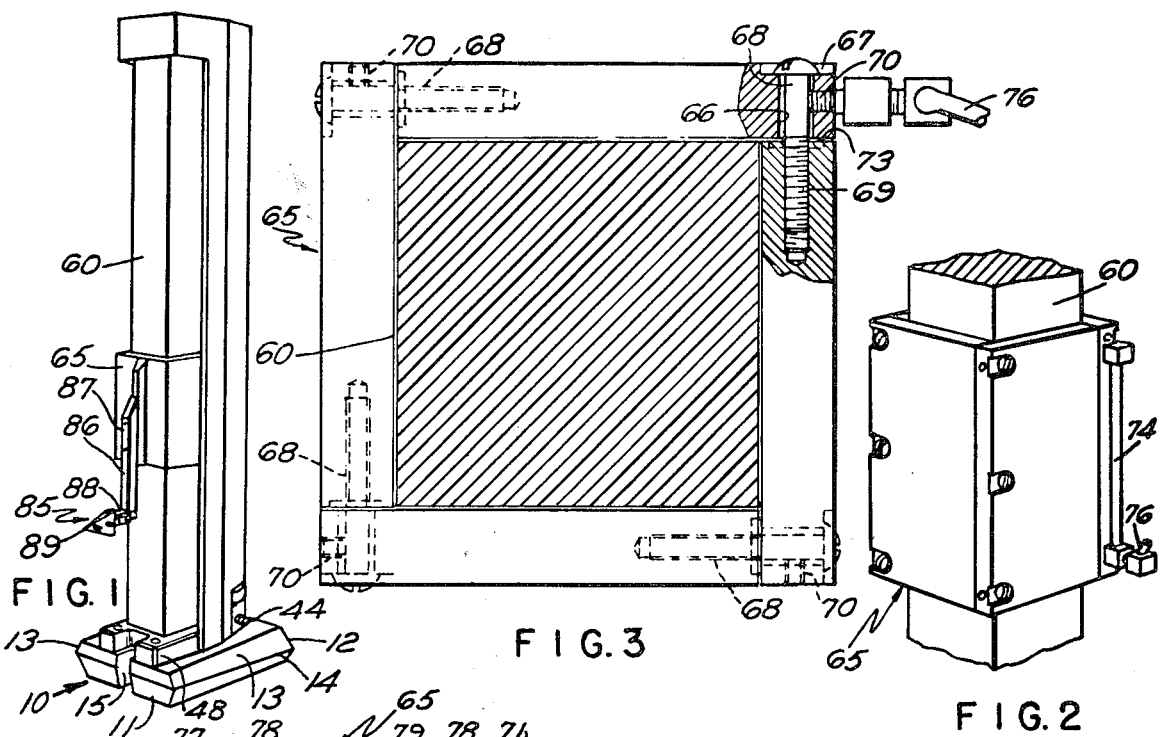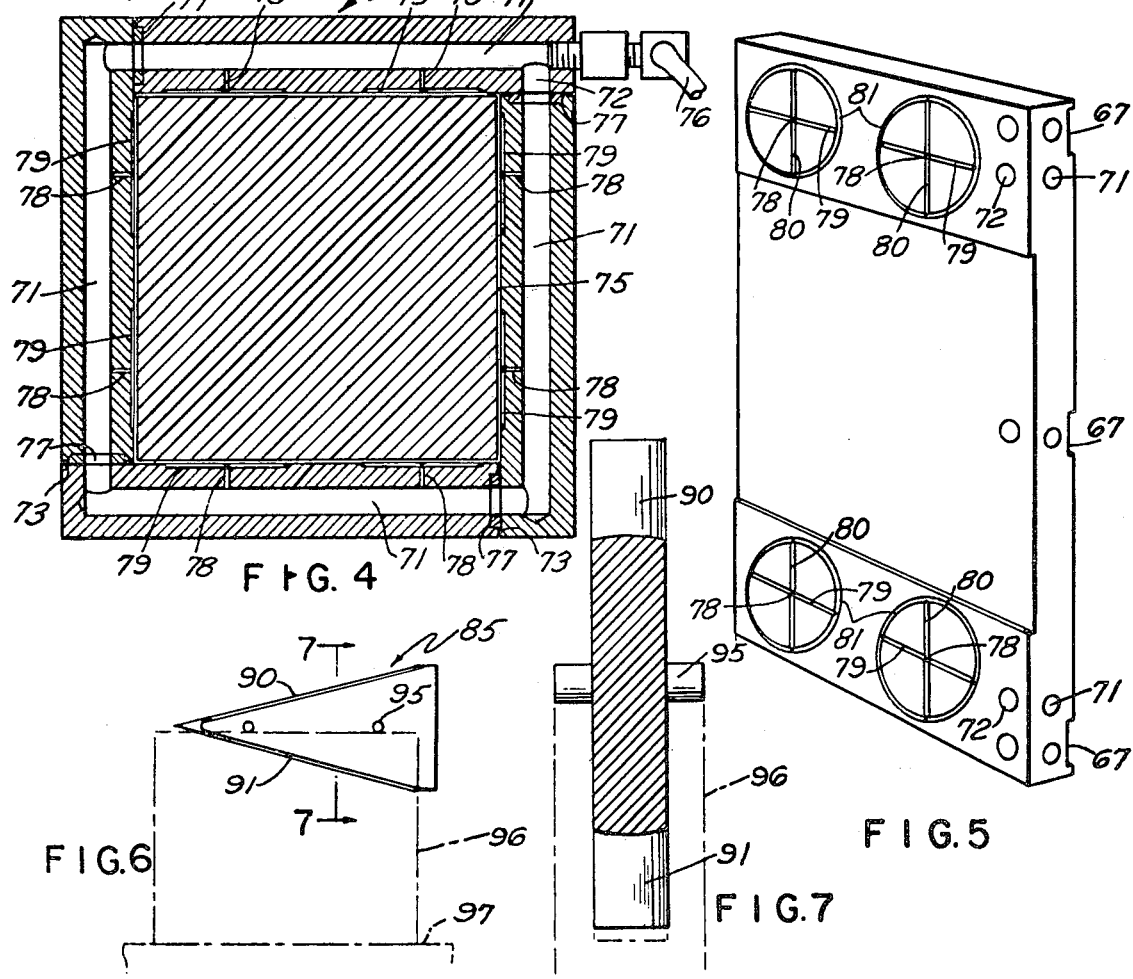

HEIGHT GAGE

CROSS REFERENCE TO RELATED APPLICATION

This application is a continuation-in-part of my earlier filed application Ser. No. 673,727 filed Apr. 5, 1976.

BACKGROUND OF THE INVENTION

Height gages having generally horizontally arranged base and a vertical column extending upwardly from the base and which are attached to a digital readout have been known and means carrying a probe have been vertically adjusted on the column by some anti-friction means such as ball bearings or the like. These are expensive to construct and have difficulties in use.

SUMMARY OF THE INVENTION

This invention provides an improved linear motion of a probe carrier slide along the vertical length of a stable granite reference surface, whereby the slide is easily positioned with minimal effort, in which air bearings are securely anchored into a prismatic configuration to insure accuracy of movement of the slide along the vertical effective measuring range of a granite column having means for the inclusion of a locking and fine adjustment for accurately positioning the slide. A tapered probe means for the measurement of holes of different diameters is rigidly attached to the air bearing slide. More specifically, the slide is expandable and formed by a plurality of plates with resilient means connecting the plates and of such a character as to flex and cause expansion of the embracing slide upon the existence of fluid pressure, such as air, between the surfaces of the slide and the column to form a frictionless fluid bearing, the resilient means contacting upon the subsequent removal of the fluid pressure so as to grip the column which it embraces.

DESCRIPTION OF THE DRAWINGS

FIG. 1 is a perspective view of the height gage;

FIG. 2 is a fragmental perspective view of the slide and column;

FIG. 3 is a sectional view through the column just above the slide with the slide also partly in section and showing the upper end of the slide;

FIG. 4 is a sectional view through the air conduits of the slide of FIG. 3;

FIG. 5 is a perspective view of one of the plates of the slide;

FIG. 6 is a fragmental elevation showing the probe and its aligning block;

FIG. 7 is a sectional view on line 7—7 of FIG. 6 and illustrating the curved opposite edges of the probe;

DESCRIPTION OF THE PREFERRED EMBODIMENT

Figure 8:
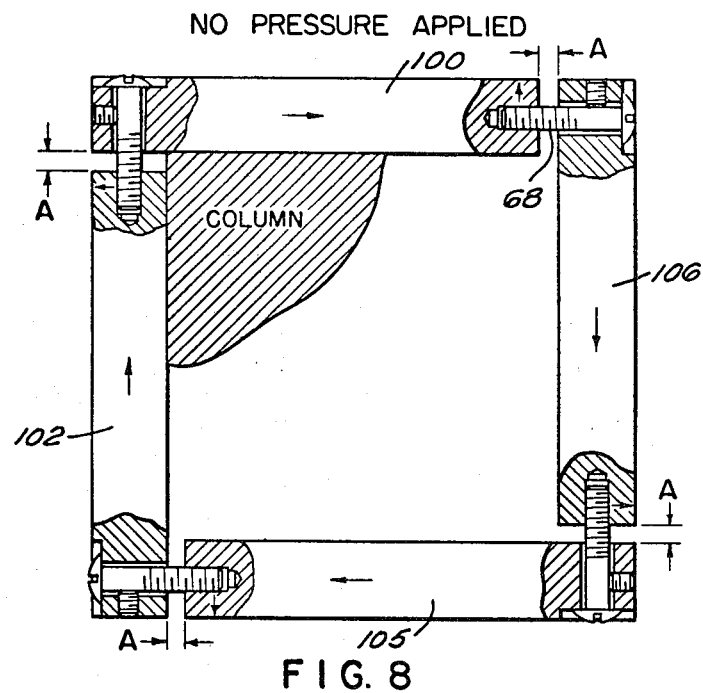
FIG. 8 is a schematic view similar to FIG. 3 showing the slide gripping the column.

The base 10 of the height gage comprises a relatively heavy block of metal with a front 11, back 12 and sides 13. The edges of the base are tapered from the top and bottom to provide a rib 14 extending about the sides of the base. The base is also recessed at its front portion as at 15 for movement close to the work to be measured.

A slide 65 has a hollow center receiving the granite column 60 and is of rectangular shape in cross section being formed of four plates such as shown individually in FIG. 5. A top plan view with a broken away section of this slide is shown in FIG. 3 where it will be seen in the broken away or sectioned portion at the upper right hand corner that there is an opening 66, leading from a recessed portion 57 in the corner of the plate, through which a clamping screw 68 extends having a much smaller diameter than the opening 66. This screw extends into a threaded opening in the adjacent plate as at 69 sufficiently as to provide the bearing assembly clearance 73 between adjacent plates, and there is a similar connection between each of the adjacent plates at both the top, bottom and intermediate portions of this slide. An adjusting screw 70 serves to hold the clamp screw 68 in the desired position as it extends through the larger opening 66. Compliance of adjacent plates to a trapazoidal or out of squareness condition of the column 60 is accommodated by a hinge effect created by pivoting of the clamp screw 68 about the end of the adjusting screw 70 allowed by the assembly clearance 73. Operating clearance 75 (FIG. 4) as provided by air pressure from the air outlet openings 78 (FIGS. 4 and 5) and brought out subsequently is adjusted at diagonal opposite corners of the slide by the adjusting screw 70 acting against the clamp screw 68 as it extends through the larger opening 66, with column and slide under air pressure.

Extending laterally through each of the plates of the slide are air conduits 71 (FIG. 4) which terminate in each of the plates. Further there are openings 72 in the inner side face of each of the plates connected to the conduits 71 and can be seen in FIG. 4 so that when the plates are placed in a relation of one edge of a plate against the inside face of an adjacent plate the opening 72 will align with the conduit 71 of the adjacent plate. Thus in the assembly of four plates as shown in FIG. 4, there will be a complete air circuit in a rectilinear path for air under pressure. A circuit such as this is provided at both the top and bottom of the slide and externally interconnected by conduit 74 extending vertically along the slide 65 with air admitted as at 76 (FIG. 2). A recess is located at the end of each of these air conduits 71 and receives an O-ring 77 to seal the conduits 71 in one plate and the opening 72 which leads to the conduit in the next plate. These O-rings are under compression to provide the seal by means of the clamping screws 68 above described and shown in FIG. 3. From each of the conduits there is provided air outlet openings 78 (FIGS. 4 and 5) on the inner surface of each of the plates from which there extends radial channels 79 and 80 in a crossing fashion and leading to a circular channel 81 for the distribution of air inwardly against the granite column 60 under air pressure when admitted as at 76. This pressure of air against the granite column will cause the screws 68 at the diagonal opposite corners to flex slightly an amount equal to clearance 75, (FIG. 4) along the width of the plate, and thus, with this air bearing, the slide may be easily moved along the column without friction. Locking of the slide in position may be had through its fine adjusting screw by a knob in back of the slide to cause two spring loaded half nuts to close against the adjusting screw. When the air pressure is shut off as at 76 the slide contracts on the column 60.

Figure 9:
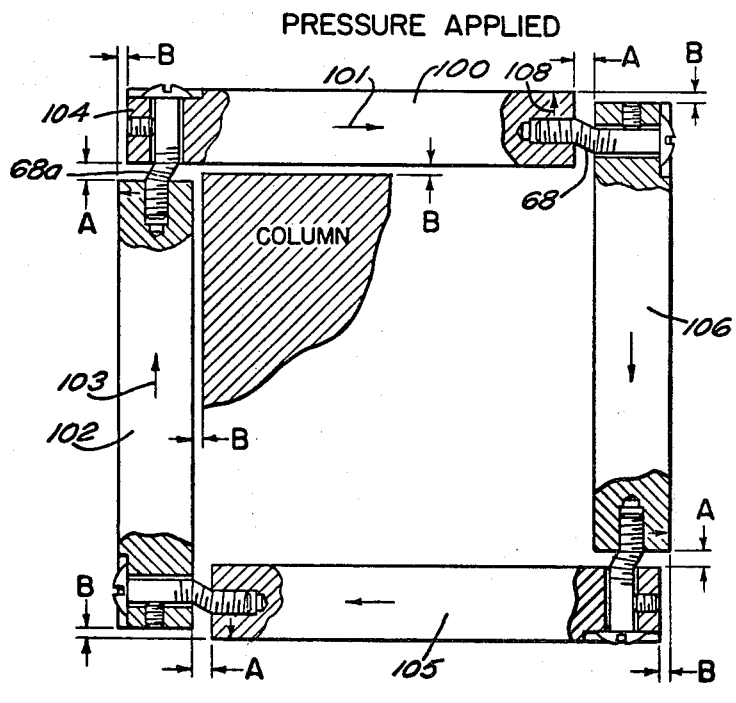
FIG. 9 is a view similar to FIG. 8 showing the slide expanded.

It will be observed as seen in FIG. 8 that there is a flexing of the screw 68 which has clearance thru the opening 66 thru which it extends. Thus, as the air is inserted in this rectangular slide, the plates expand from clamping the granite column 60 and provide a frictionless bearing. This expansion occurs by reason of the flexing of the threaded connecting means 68. In FIG. 8 the slide is shown with no air pressure applied, while FIG. 9 indicates the air pressure applied. Connecting screws 68 in FIG. 8 are indicated as in a straight line or having a straight axis, and in this position the slide engages the column and will not move along the column. The spacing of the plates is largely exaggerated for clarity. For example, when the pressure is applied the plate 100 will move as shown in FIG. 9 in the direction of arrow 108 to flex the screw 68. This plate will move as shown at B substantially. 0.01778mm with reference to the column as shown in the illustration. Plate 100 will also move as shown by arrow 101. At the same time the pressure will move all of the plates similarly. Thus plate 102 will be moved in the direction of arrow 103 which will move the end 104 of the plate 100 also outwardly a distance A or 0.1016mm from plate 102 by a thrust on the screw 68a. Thus through diagonal corners of the plate, the plate 100 will be moved outwardly for a clearance of the column. This same action or relative movement occurs on the plate 105 which is opposite the plate 100 and likewise the same action will occur on the other opposite plates 106 and 102. Thus, all four plates not only move outwardly away from the column a distance B or 0.01778mm but also endwise a distance A or 0.1016mm at the same time that the pressure is applied which causes the flexing of the screws 68 as indicated in FIG. 9.

The slide carries a probe 85 (FIG. 6) on an arm 86 attached to the slide as at 87 and which is on the end of a laterally extending arm 88. This probe designated generally 85 is generally triangular in shape with the pointed end 89 suitable for indicating on the work the position of the gage. Different shape probes may be provided rigidly attached to the slide. The probe 85 is in the form of a slice of a cone containing its center axis with the upper surface 90 and lower surface 91 of the probe on the arc of the same circle so that when the probe extends into an opening a single point on the same circle on each surface 90 and 91 will engage the opening to locate the center of a diameter.

Cylindrical pins 95 extend laterally from the triangular probe and are located so that the lower tangent of the cylindrical surface lies on the center line of the probe. The probe may be set parallel to the surface plate 97 by means of a calibrating block 96 which will rest upon a flat surface plate 97 and the pins of the probe may be made parallel to the surface plate by adjustment in the base. The calibrating block 96 may be turned around 180° about a vertical axis to see if the pins 95 engage the calibrating block 96 in the new position. If not, the block is in error, and calibration must be begun again with another block standard.

I claim:

1. In a height gage, a generally horizontally disposed base and a generally vertically disposed column extending upwardly therefrom, said column having a plurality of vertically disposed surfaces, a slide embracing said column and presenting slide surfaces to the surfaces of said column, characterized by said slide being expandible and formed by a plurality of plates, resilient means connecting said plates, said means of a character to flex and cause expansion of the embracing slide upon the existence of fluid pressure between the surfaces of said slide and column to form a frictionless fluid bearing and subsequent contraction in the absence of such fluid pressure to grip the column, said slide surfaces having a plurality of fluid openings and means to supply fluid to said fluid openings to expand said slide.

2. In a height gage as in claim 1 wherein each plate has a fluid conduit therein, said conduit in one plate registering with a conduit in the adjoining plate, sealing means between adjoining plates at the conduit registration held compressed by said resilient means and flexing upon the supply and release of pressure.

3. In a height gage as in claim 1 wherein said resilient means is threaded into one plate and has a clearance through an adjoining plate and an adjusting screw enters said clearance and engages the threaded means.

4. In a height gage as in claim 1 wherein said slide carries a probe rigidly attached on said slide, said probe being pointed away from said column with the sides leading therefrom being arcuate and symmetrical with reference to a horizontal to extend into openings of different diameters and touch at single diametrical opposite points.

5. In a height gage as in claim 1 wherein said slide carries a probe rigidly attached on said slide, said probe being pointed away from said column with the sides leading therefrom being arcuate and symmetrical with reference to a horizontal to extend into openings of different diameters and touch at single diametrical opposite points and the sides of said probe has a pair of laterally extending pins for engaging a calibrating block.

* * * * *